No. 622,742. Patented Apr. 11, 1899.
J. D. WILLIAMS.
MINER'S LAMP.
(Application filed Mar. 15, 1898.)
(No Model.)
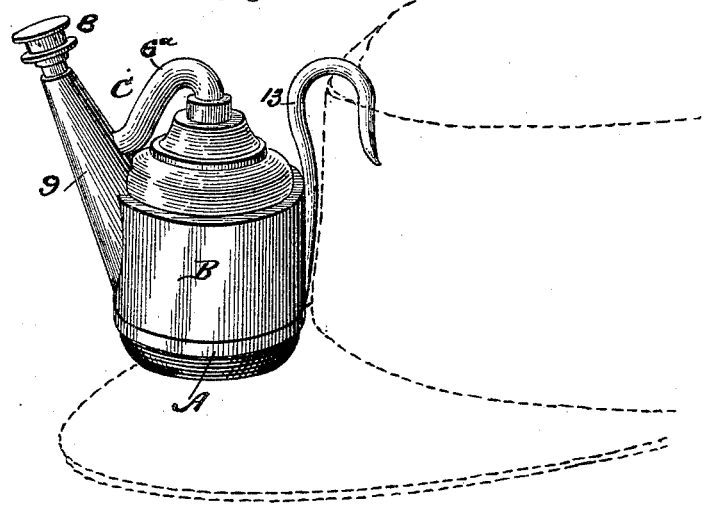
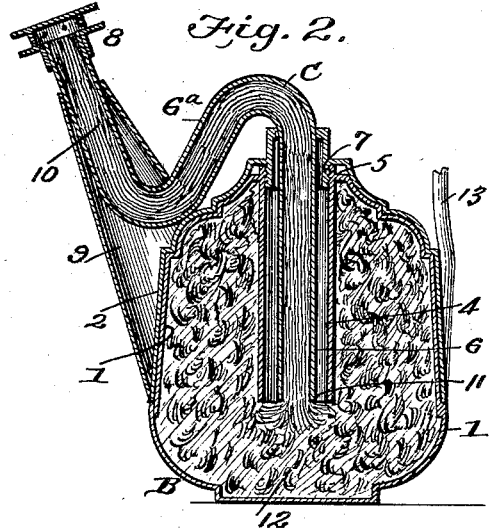
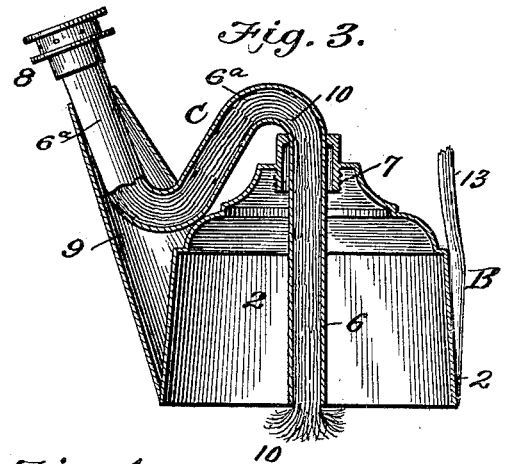
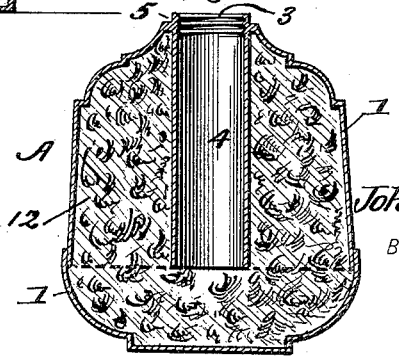
WITNESSES:
M. D. Bloudel
Amos W. Hart
INVENTOR
John D. Williams.
BY Munn & Co.
ATTORNEYS.

UNITED STATES PATENT OFFICE.

JOHN DANIEL WILLIAMS, OF SHERODSVILLE, OHIO.

MINER'S LAMP.

SPECIFICATION forming part of Letters Patent No. 622,742, dated April 11, 1899.

Application filed March 15, 1898. Serial No. 673,894. (No model.)

*To all whom it may concern:*

Be it known that I, JOHN DANIEL WILLIAMS, of Sherodsville, in the county of Carroll and State of Ohio, have invented a new and useful Improvement in Miners' Lamps, of which the following is a specification.

My invention is an improvement in the class of miners' lamps which are provided with vapor-burners and otherwise so constructed as to be adapted for use of gasolene or some other vaporizable liquid hydrocarbon.

The construction and combination of parts are such as to render the lamp perfectly safe from explosion when in use, to adapt it to be safely filled when lighted, and to increase its strength and durability.

In accompanying drawings, Figure 1 is a perspective view of the lamp applied to a miner's cap. Fig. 2 is a central vertical section of the lamp. Fig. 3 is a central vertical section of the cover of the bowl. Fig. 4 is a central vertical section of the bowl.

The lamp is composed, mainly, of three parts A, B, and C, which constitute the bowl, cover, and wick-tube, respectively. The bowl A has a flat base, a circular and slightly-tapering body 1, a conical top 2, having a circular aperture 3, and an internal vertical central tube 4, which is open-ended, but solid or imperforate throughout its length. It is soldered or otherwise permanently attached to the internally-threaded collar 5, pendent from the conical top 2. The body 1ª of the removable cap or cover B is tapered slightly, corresponding to the body 1 of the bowl A, so that it will fit closely on the latter, as shown in Figs. 1 and 2. Within the cover B is a central pendent imperforate portion 6 of the wick-tube C. The same (6) is open at the bottom and has the same length as the internal tube 4 of the bowl A, by which it is inclosed.

The pendent boss or collar 7 of the cover B is threaded exteriorly and adapted to screw into the collar 5 of the bowl. Thus the two main parts of the lamp—the bowl A and cover B—are adapted to be detached when required, but constitute practically one structure or article when connected for use.

The exterior portion 6ª of the wick-tube C is approximately S-shaped, the same having a downward curve from the top of the cover B and then an upward curve at its free end, to which the flanged and perforated burner proper, 8, is detachably secured. Such upcurved portion is braced and supported by a conical sheet-metal tube 9, similar in form and arrangement to the wick-tube of the old form of miner's lamp. In addition to its mechanical function this support 9 also imparts a more symmetrical appearance to the lamp.

A wick 10 is drawn through the tube C from the burner 8 to the lower end 11 of the said tube within the bowl A of the lamp, where it projects, as shown, so as to lie in contact with the sponge 12, which fills the chamber of the bowl surrounding the pendent tube 4. This sponge 22 is saturated with gasolene or some other easily-volatilizable liquid hydrocarbon; but none of the oil is intentionally left free in the bowl.

The gasolene is taken up by the wick 10 and traverses the same by capillary attraction. In order to light the lamp, it is therefore only necessary to heat the burner 8 by means of a lighted match or other means, whereupon the inflammable gas or vapor issues from the minute perforations in the burner.

The imperforate tube 4 within the bowl A prevents contact of the wick-tube with the sponge 12, also escape of any free gasolene there may chance to be in the bowl in case the lamp is overturned or inverted. It also cuts off free access of air, and thus retards vaporization when the lamp-cover B is separated from the bowl A and to such an extent that the aperture of the latter may be placed in a flame without igniting the gasolene even when the sponge is saturated. The element of safety from explosion is thus practically assured.

The cover B adds to the strength of the body of the lamp and by increasing the thickness of the body of the same retards vaporization of the gasolene. That part 6 of the wick-tube C within the cover B is slightly shorter than the body of the latter, which is adapted to be set and support itself on a flat surface. The vapor will continue to be emitted from the burner for some minutes after the cover B has been thus detached from the bowl A, which is often a great convenience when filling the bowl.

The object of the curves in the exterior wick-tube 6ª is to render the tube of such length as to prevent access of undue heat to the bowl A and remove the flame farther from the hand or cap of the miner than is possible with the old form of lamp having a vertical wick-tube. A hook 13 is attached to the cover B at a point on the side which is directly opposite the wick-tube C, as usual in miners' lamps.

What I claim is—

1. In a miner's lamp, the combination, with the lamp-bowl, of the detachable and removable cover, adapted to fit upon the body of the former, and provided with a wick-tube, substantially as shown and described.

2. In a miner's lamp, the combination with the lamp-bowl, of the detachable cover which fits upon the top and body of the same, the two parts being connected by a screw-joint substantially as shown and described.

3. In a miner's lamp, the combination with the lamp-bowl having a tapered circular body, of the cover which is similarly tapered and adapted to fit upon the top and body of the same, an internally-threaded pendent collar fixed in the aperture of said bowl, and a correspondingly-threaded and pendent boss or collar on the cover, as shown and described.

4. In a miner's lamp, the combination with the lamp-bowl having an open-end tube which is pendent from the collared aperture, and made imperforate as specified, and the cover made independent of and detachable from the lamp-bowl upon which it is adapted to fit as specified, a pendent wick-tube that fits within the bowl-tube, substantially as shown and described.

5. In a miner's lamp, the cover for the body of the same having a wick-tube attached which extends downward interiorly to a distance slightly less than the body of said cover, and the edge of the latter being adapted to rest on a flat surface, as and for the purpose specified.

JOHN DANIEL WILLIAMS.

Witnesses:
R. R. JONES,
H. C. ALLMAN.